United States Patent [19]

Morin et al.

[11] Patent Number: 5,260,964
[45] Date of Patent: Nov. 9, 1993

[54] GRADED REFLECTIVITY MIRROR RESONATORS FOR LASERS WITH A GAIN MEDIUM HAVING A NON-CIRCULAR CROSS-SECTION

[75] Inventors: Michel Morin, Cap Rouge; Gaétan Duplain, Québec, both of Canada

[73] Assignee: Institut National d'Optique, Sainte-Foy, Canada

[21] Appl. No.: 906,265

[22] Filed: Jun. 26, 1992

[51] Int. Cl.⁵ .................................................. H01S 3/08
[52] U.S. Cl. ........................................ 372/95; 372/99
[58] Field of Search .................... 372/95, 99; 359/839, 359/858, 859

[56] References Cited

U.S. PATENT DOCUMENTS

| | | | |
|---|---|---|---|
| 4,214,216 | 7/1980 | Jones, Jr. | 331/94.5 |
| 4,360,925 | 11/1982 | Brosnan et al. | 372/95 |
| 4,393,303 | 7/1983 | Spinhirne | 372/95 |
| 4,559,627 | 12/1985 | Chun | 372/92 |
| 4,646,314 | 2/1987 | Opower | 372/95 |
| 4,947,402 | 8/1990 | Kane | 359/858 |
| 4,953,175 | 8/1990 | DeSilvestri et al. | 372/95 |
| 5,058,123 | 10/1991 | Yasui et al. | 372/99 |

FOREIGN PATENT DOCUMENTS 1298724 4/1992 Canada .

OTHER PUBLICATIONS

W. B. Jones, "The slab geometry laser", Laser Focus/Electro-Optics, vol. 19, No. 9, p. 107 (1983).
Q. Lü et J. Eicher, "Off-axis prism resonator for improved beam quality of slab lasers", Optics Letters, vol. 15, No. 23, p. 1357 (1990).
N. Hodgson, T. Haase and H. Weber, "Improved Resonator Design for Rod Lasers and Slab Lasers", SPIE, vol. 1277, p. 70 (1990).
A. S. Ghalumian, A. A. Glushko and K. B. Petrossian, "YAD:Nd³⁺ slab laser with unstable resonator", Infrared Phys., vol. 32, p. 105 (1991).
A. Borguese, R. Canevari, V. Donati and L. Garifo, "Unstable-stable resonators with toroidal mirrors", Applied Optics, vol. 20, No. 20, p. 3547 (1981).
K. Kuba, T. Yamamoto and S. Yagi, "Improvement of slab-laser beam divergence by using an off-axis unstable-stable resonator", Optics Letters, vol. 15, No. 2, p. 121 (1990).
P. E. Jackson, H. J. Baker and D. R. Hall, "$CO_2$ large-area discharge laser using an unstable-waveguide hybrid resonator", Appl. Phys. Lett. vol. 54, No. 20, p. 1950 (1989).
R. Nowack, H. Opower, U. Schaefer K. Wessel, Th. Hall, H. Krüger and H. Weber, "High Power $CO_2$ Waveguide Laser of the 1 kW Category", SPIE, vol. 1276, p. 18 (1990).
D. R. Hall and H. J. Baker, "Area scaling boosts $CO_2$-laser performance", Laser Focus World, Oct. 1989, p. 77.
J. Nishimae and K. Yoshizawa, "Development of $CO_2$ laser excited by 2.45 GHz microwave discharge", SPIE, vol. 1225, p. 340 (1990).
M. K. Reed and R. L. Byer, "The Output Beam Quality of a Q-Switched Nd:Glass Slab Laser", IEEE Journal of Quantum Electronics, vol. 26, No. 12, p. 2138 (1990).

(List continued on next page.)

Primary Examiner—Rodney B. Bovernick
Assistant Examiner—Robert E. Wise
Attorney, Agent, or Firm—Merchant, Gould, Smith, Edell, Welter & Schmidt

[57] ABSTRACT

A resonator for the modal control of a laser with a gain medium having a non-circular cross-section in a plane perpendicular to the optical axis of the resonator. It has a graded reflectivity mirror as the output coupler. The graded reflectivity mirror consists of a partial reflector which has a reflectivity that varies gradually according to the position on the mirror's surface. The resonator is either astigmatic or the graded reflectivity mirror has a non circularly symmetric reflectivity profile or both. It allows the production of a good optical quality beam with an efficient energy extraction.

10 Claims, 8 Drawing Sheets

OTHER PUBLICATIONS

Y. A. Anan'ev, V. N. Chernov and V. E. Sherstobitov, "Solid laser with a high spatial coherence of radiation", Soviet Journal of Quantum Electronics, vol. 1, No. 4, p. 403 (1972).

E. A. Phillips, J. P. Reilly and D. B. Northam, "Off-axis unstable laser resonator: operation", Applied Optics, vol. 15, No. 9, p. 2159 (1976).

M. M. Weiner, "Modes of empty off-axis unstable resonators with rectangular mirrors", Applied Optics, vol. 18, No. 11, p. 1828 (1979).

M. Garbi and S. Mezzetti, "Design and performance of a Q switch Nd laser with 10 j pulse emission in burst mode", SPIE, vol. 1277, p. 92 (1990).

A. Parent et al., "Effects of Hard Apertures on Mode Properties of Resonators with Gaussian Reflectivity Mirrors", IEEE Journal of Quantum Electronics, vol. QE-23, No. 2, pp. 222-228 (Feb. 1987).

GRADED REFLECTIVITY MIRROR RESONATORS FOR LASERS WITH A GAIN MEDIUM HAVING A NON-CIRCULAR CROSS-SECTION

FIELD OF THE INVENTION

The present invention relates to resonators for the modal control of a laser having a gain medium with a non-circular section in a plane perpendicular to the optical axis of the resonator.

DESCRIPTION OF PRIOR ART

A generic laser is made up of a gain medium, a pumping device and a resonator. The pumping device (e.g. a flashlamp, an electrical discharge system or other suitable means) provides energy which is absorbed by the gain medium. The gain medium may be either solid, liquid or gaseous. In its simplest form, the resonator is made up of two curved mirrors facing one another, each mirror standing at one end of the gain medium. A mirror is defined here as any single optical element or combination of optical elements which reflects all or part of incoming radiation. An example of such a combination would be a lens standing in front of a flat reflecting surface. One mirror is totally reflective whereas the other one has a reflectivity lower than 100%. Part of the absorbed energy is reemitted spontaneously by the gain medium as photons at the laser wavelength. The photons propagating along a line connecting the centers of curvature of the mirrors, called the optical axis of the resonator, are forced by the mirrors to do roundtrips inside the resonator. They get amplified each time they go through the gain medium, hence the build-up of the laser field inside of the resonator. The beam produced by the laser comes out through the lower reflectivity mirror, called the output coupler.

The resonator provides the feedback which allows the build-up of the laser field. The feedback must be adjusted to efficiently extract the energy from the gain medium. An insufficient feedback impedes the build up of the laser field and the available energy gets lost as spontaneous emission. Too large a feedback retains the laser energy within the cavity, which then gets dissipated through absorption or diffraction losses. Lower gain lasers require a stronger feedback.

The resonator also sets a preferred direction of propagation of the laser energy since photons propagating transversely to the optical axis leave the laser without getting amplified. It actually defines a set of electromagnetic modes, i.e. spatial field distributions which self-reproduce at each roundtrip inside the resonator. The laser field is made-up of a combination of these modes. The modal content of the laser field has a strong influence on the focusability of the output beam, hence the importance of designing properly the resonator.

There exists two major types of resonators depending on the curvature of the mirrors and their separation. Geometrically stable resonators sustain modes which are confined transversely to the optical axis. The fundamental mode of such a resonator is the one most confined around the optical axis. Higher order modes are wider and thus occupy a larger fraction of the gain medium. Their optical quality, i.e. their ability to get focussed to a small spot, is lower than that of the fundamental mode. The number of modes oscillating is determined by the size of the gain medium, unless an aperture is inserted inside the cavity to block some of the higher order modes. Practical stable resonators, i.e. resonators with a manageable length and misalignment sensitivity (a resonator is misaligned when its optical axis is at an angle with the longitudinal symmetry axis of the gain medium), support a fundamental mode which is small relative to the size of the gain medium. Efficient extraction of the energy contained in the gain medium can be realized only by allowing the oscillation of higher order modes, which leads to a degradation of the optical quality of the output beam.

Unstable resonators provide a large fundamental mode of a good optical quality by producing a beam which gets magnified at each roundtrip. The size of the mode is kept finite by taking away the outmost part of the magnified beam at each roundtrip. This can be done for example by letting some energy leak out from around a dot mirror, which is a mirror with a limited reflecting area. The laser then produces an annular output beam. This hard edge coupling leads to the presence of significant ripples in the transverse field pattern which may lead to optical damage, especially in high power lasers. The mode can be adjusted to fill the gain medium by varying the size of the dot mirror reflecting area and/or the magnification. In stable resonators, the feedback is set by the reflectivity of the output coupler. In unstable resonators, the feedback is determined by the magnification. A higher magnification increases the fraction of the beam leaking out from the resonator and thus decreases the feedback. Unstable resonators are used preferably with high gain lasers. With low gain lasers, the output coupling must be reduced by using a lower magnification. This increases the sensitivity of the resonator to misalignments. It also reduces the thickness of the annular output beam and its focussability, the focal pattern then presenting significant sidelobes. This problem may be alleviated by using the unstable resonator in an off-axis configuration, whereby the output beam leaves the cavity by one side of the output coupler instead of symmetrically around it.

Many resonator configurations have been used in the past to control the modes of a laser having a gain medium with a large cross-sectional aspect ratio. The expression "large cross-sectional aspect ratio" refers to a gain medium having a cross-section in a plane perpendicular to the optical axis with a width substantially greater than the height. Multi-pass resonators have been used to this effect. These are folded stable resonators made up of many standard spherical mirrors which support a confined mode making multiple passes along the width of the gain medium. The number of mirrors involved increases the difficulty of alignment. The laser is also more sensitive to parasitic oscillations and mode filling is less efficient. The resonator may also be folded with a prism. This improves the mode-filling and eases the alignment. All multi-pass configurations lead to an increase of the flux incident on the resonator mirrors and limit the energy which may be stored in the gain medium. These limitations become more acute as the number of passes is increased. The multi-pass trajectory of the beam may also be susceptible to thermal effects in the case of lasers with a solid gain medium.

Unstable resonators have also been used, in which the surface of the reflecting area of the dot mirror is shaped to image the cross-section of the gain medium.

Various types of astigmatic resonators, comprising one or two astigmatic mirrors, have also been used. An astigmatic mirror has two different radii of curvature along two perpendicular axes, called the principal axes of the mirror, which result in different focal powers along these axes. A cylindrical mirror is an example of this, which is curved along one axis and is flat perpendicularly to it. Such a mirror has a given focal power in one direction and no focal power perpendicularly to it. In the resonators under consideration, the astigmatic mirrors are used with their principal axes standing parallel to the width and height of the large aspect ratio gain medium. The different focusing powers of the resonator allow the independent control of the modal properties of the laser beam along the width and height of the gain medium. It also allows the separate correction of a differential focusing occurring along the width and height of the gain medium as in solid state slab lasers. In all cases, the resonator is unstable along the width of the gain medium. This ensures good mode filling of the gain medium as well as good focusing of the output beam along this axis. At low magnifications, an off-axis configuration is used to improve focusing.

Along the height of the gain medium, the resonator may be plane-plane. The resonator is then made up of two cylindrical mirrors having no focusing power along the height of the gain medium. This leads to a high sensitivity to misalignments, unless intra-resonator focusing makes the resonator stable.

The resonator may also be geometrically stable along the height of the gain medium. In this case, good optical quality along this direction will be maintained if the height of the gain medium is small enough to allow only the oscillation of a small number of modes.

Hybrid waveguide unstable resonators have also been used with gas lasers. The gain medium then consists of a gas which is contained between two flat metallic plates standing close and parallel to one another. The height of the gain medium then corresponds to the distance separating the plates. These plates behave as a planar one-dimensional waveguide at the laser wavelength, a waveguide which supports well defined modes. The astigmatic resonator is again unstable along the width of the gain medium. The mirrors' radius of curvature along the thickness of the waveguide and their distance from the ends of the waveguide are chosen to favor the excitation of the fundamental mode of the one-dimensional waveguide.

The use of a graded reflectivity mirror (GRM) as the output coupler improves the performance of an unstable resonator. The GRM, also known as variable reflectivity mirror (VRM) or Gaussian or Super-Gaussian mirror, has a reflectivity which varies gradually as a function of the position on the mirror's surface. Typically, the reflectivity is greatest at the center of the mirror and goes down as one moves towards the edge of the mirror. Compared to a dot mirror, the GRM provides a better modal discrimination in an unstable resonator, i.e. it favors the oscillation of the fundamental mode against that of higher order modes. It also improves the optical quality of the output beam especially at low magnifications, without having to use an off-axis configuration. The tapered reflectivity profile also leads to a decrease of the ripples in the field profile and thus reduces the risk of optical damage when used with high intensity lasers. Prior to the present invention, resonators with a GRM output coupler have been designed to be isotropic, i.e. to sustain modes which are circularly symmetric around the optical axis. The resonator is made up of spherical non-astigmatic mirrors and the iso-reflectivity curves of the GRM are concentric circles. "Iso-reflectivity curves" refers to virtual curves that connect together the points at the surface of the GRM at which the reflectivity is the same. Such a resonator is not well adapted to a gain medium with a large cross-sectional aspect ratio. For such a gain medium, a resonator is required which produces a fundamental mode with a large aspect ratio which fits well inside the cross-section of the gain medium.

SUMMARY OF THE INVENTION

The object of the present invention is to use a GRM in an anisotropic resonator sustaining a fundamental mode with a non-circular cross-section.

According to the invention, the resonator comprises: a first mirror with a uniform reflectivity; a GRM facing said first mirror; an optical axis joining the centers of curvature of the mirror and GRM; two axes, x and y, perpendicular to one another and perpendicular to the optical axis. The improvement consists of using a first mirror which is astigmatic with principal axes parallel to the x and y axes and/or a GRM which is astigmatic with principal axes parallel to the x an y axes and/or a GRM with non-circular iso-reflectivity curves.

According to preferred embodiments, the resonator is unstable along axis x with a magnification $M_x$.

According to another preferred embodiment, the resonator is unstable along axis y with a magnification $M_y$ equal to $M_x$.

According to another preferred embodiment, the resonator is unstable along axis y with a magnification $M_y$ not equal to $M_x$.

According to another preferred embodiment, the first mirror and GRM are cylindrical and flat along the y axis.

According to another preferred embodiment, the resonator is stable along the y axis and the iso-reflectivity curves of the GRM are straight lines parallel to the y axis.

According to another preferred embodiment, the resonator is stable along the y axis and the iso-reflectivity curves of the GRM are concentric circles.

According to another preferred embodiment, the resonator sustains a mode which matches that of a planar waveguide along the y axis.

DESCRIPTION OF SOME PREFERRED EMBODIMENTS

Figure 1:
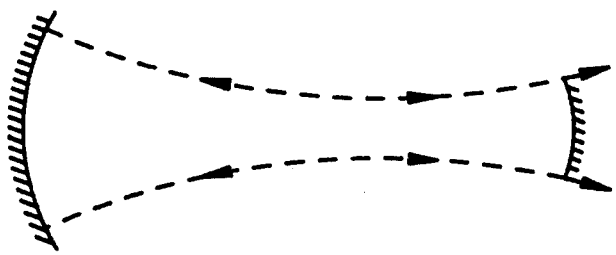
FIG. 1 is a schematic view of a stable resonator and its fundamental mode as found in the prior art.
Figure 2:
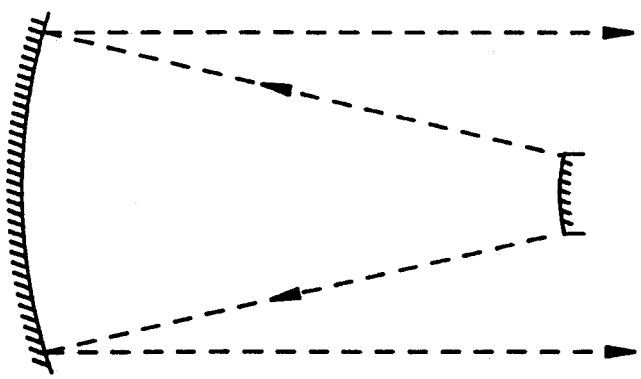
FIG. 2 is a schematic view of an unstable resonator sustaining a magnifying wave leaking out around the reflective area of a dot mirror as found in the prior art.
Figure 3:
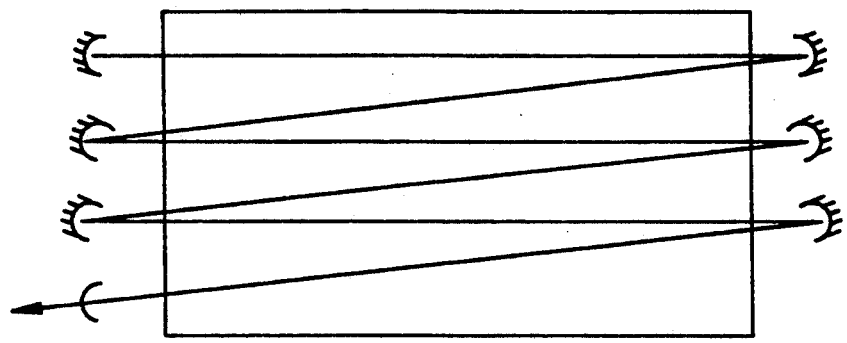
FIG. 3 is a schematic view of a multi-pass resonator as found in the prior art.
Figure 4:
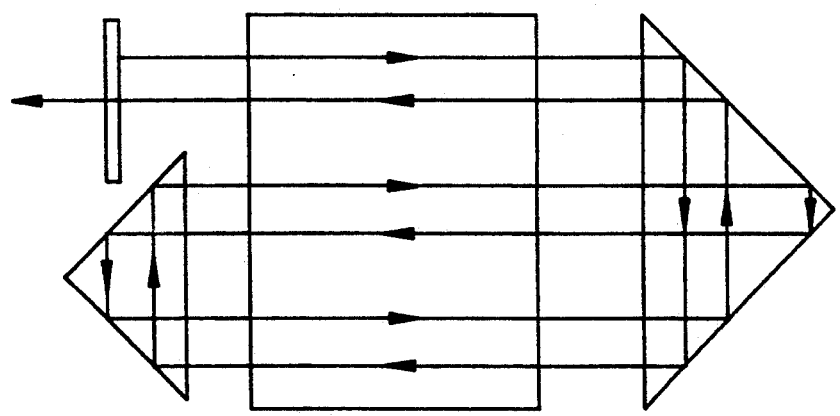
FIG. 4 is a schematic view of a multi-pass resonator folded with prisms as found in the prior art.
Figure 5:
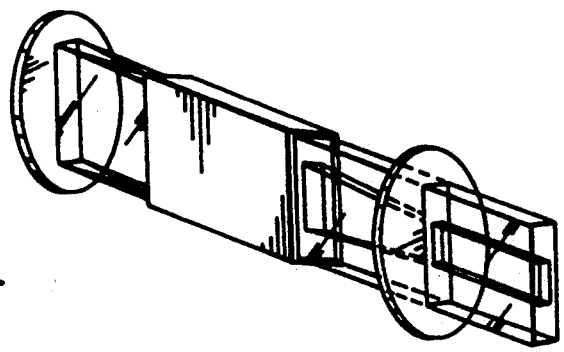
FIG. 5 is a schematic view of an unstable resonator with a dot mirror having a reflective area which images the shape of the cross-section of the gain medium as found in prior art.
Figure 6:
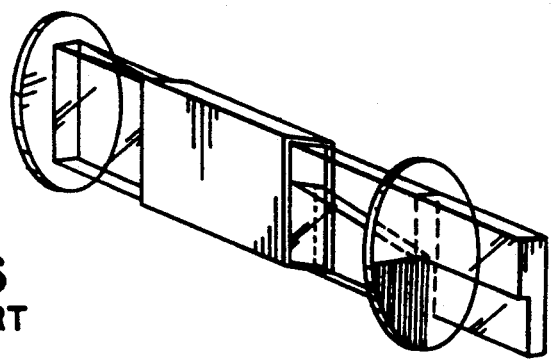
FIG. 6 is a schematic view of an unstable resonator with an off-axis coupling as found in prior art.
Figure 7:
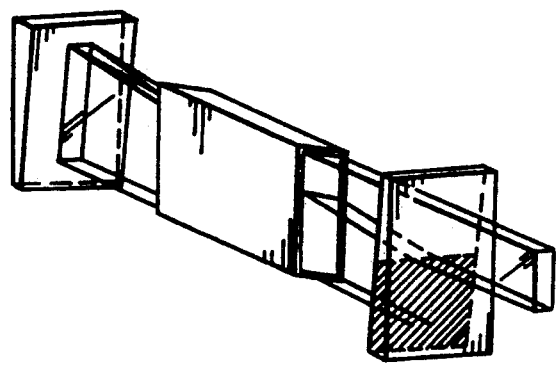
FIG. 7 is a schematic view of an astigmatic planar-unstable resonator with off-axis coupling as found in prior art.
Figure 8:
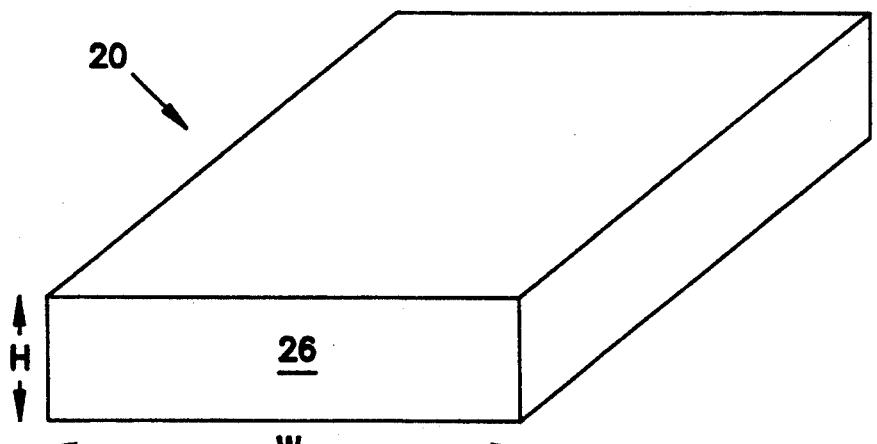
FIG. 8 is a schematic perspective view of an example of a gain medium having a large aspect ratio.

According to the invention, a graded reflectivity mirror (GRM) is used as the output coupler of an anisotropic resonator designed to sustain a fundamental mode with a large cross-sectional aspect ratio. Such a resonator will allow efficient extraction of energy from a laser with a gain medium having a non-circular cross-section or a large cross-sectional aspect ratio with an output beam of a good optical quality. An example of such a gain medium is schematically illustrated in FIG. 8. As shown, "large cross-sectional aspect ratio" refers to a gain medium having a cross-section with a width W substantially greater than the height H, the ratio being the width divided by the height (W/H).

The resonator can be made anisotropic, i.e. sustaining modes which are different along the width and the height of the gain medium, either by using astigmatic mirrors and/or a GRM with non circular iso-reflectivity curves. The principal axes of the astigmatic mirrors are parallel to the width and height of the gain medium. In all cases, the resonator is unstable along the width of the gain medium. This produces a large fundamental mode with a width comparable to that of the gain medium. The use of a GRM as the output coupler reduces the ripples in the field distribution. It also provides a good focussability at low magnifications without having to use an off-axis configuration as found in the prior art. Many possible configurations can be used to control the modes along the height of the gain medium.

Figure 9:
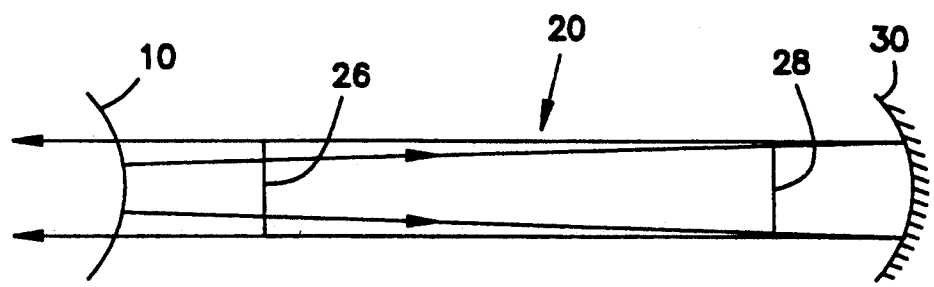
FIG. 9 is a schematic side view of an unstable resonator using a GRM as the output coupler.
Figure 10:
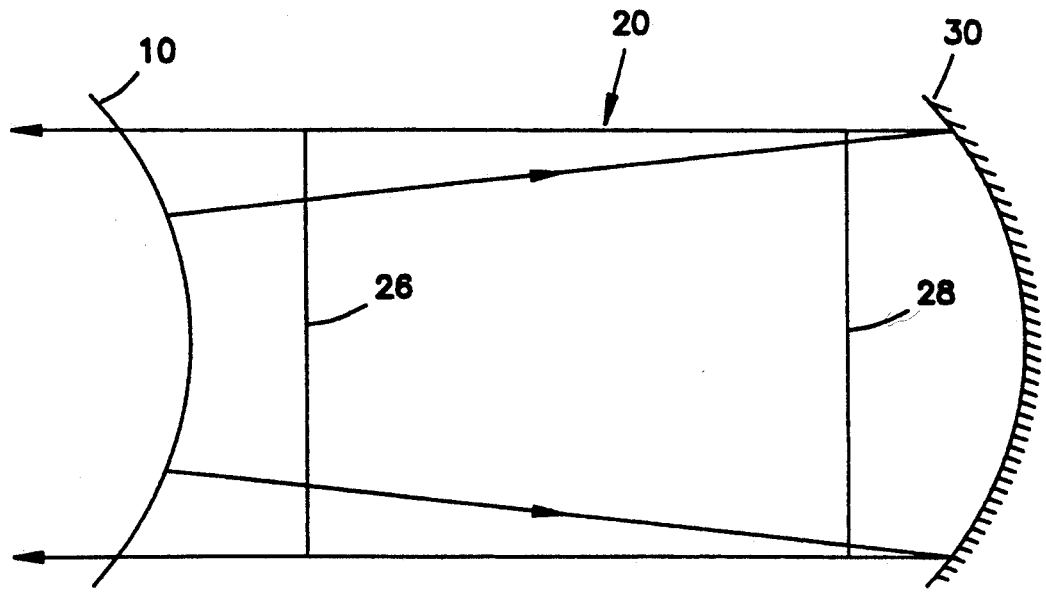
FIG. 10 is a schematic top view of the resonator of FIG. 9.
Figure 11:
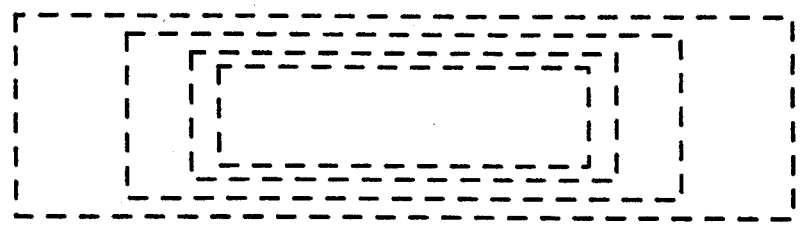
FIG. 11 is a schematic front view of an example of iso-reflectivity curves of a GRM which may be used with the resonator of FIG. 9.

One can use an unstable resonator, shown in FIGS. 9 and 10, made up of spherical non-astigmatic mirror 30 and GRM 10, with the GRM 10 having iso-reflectivity curves with an aspect ratio similar to that of the gain medium 20, as shown in FIG. 11. The magnification of the resonator is the same along the width and the height of the gain medium. The aspect ratio of the iso-reflectivity curves then provides the correct aspect ratio to the fundamental mode. Such a configuration would be preferable when the height of the gain medium is still too large to allow a good modal control with a stable cavity. The gain medium 20 has a front face 26 and a rear face 28.

Figure 12:
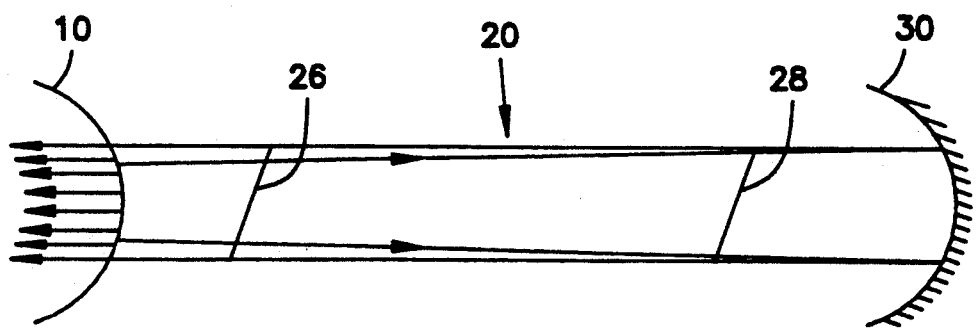
FIG. 12 is a schematic side view of an astigmatic unstable resonator using a GRM as the output coupler.
Figure 13:
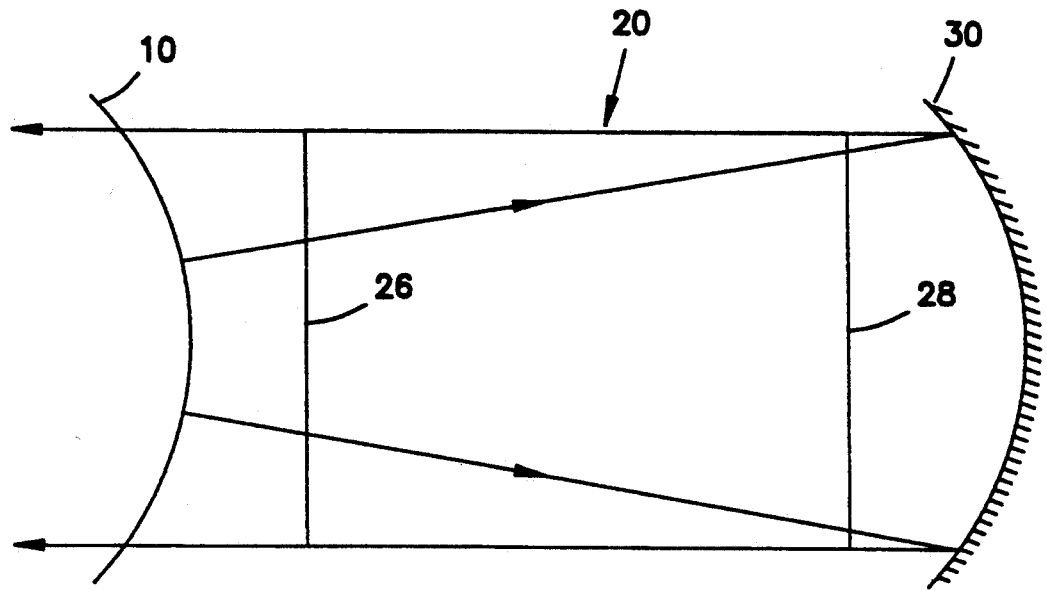
FIG. 13 is a schematic top view of the resonator of FIG. 12.
Figure 14:
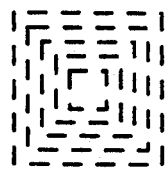
FIG. 14 is a schematic front view of an example of the iso-reflectivity curves of a GRM which may be used with the resonator of FIG. 12.

One can also use an astigmatic unstable resonator, as shown in FIGS. 12 and 13, with a GRM 10 having iso-reflectivity curves with a unitary aspect ratio, as shown in FIG. 14. The astigmatism of the mirror 30 and the GRM 10 is then chosen to get a magnification which is smaller along the height of the gain medium so that the fundamental mode fits well inside the cross-section of the gain medium.

Figure 15:
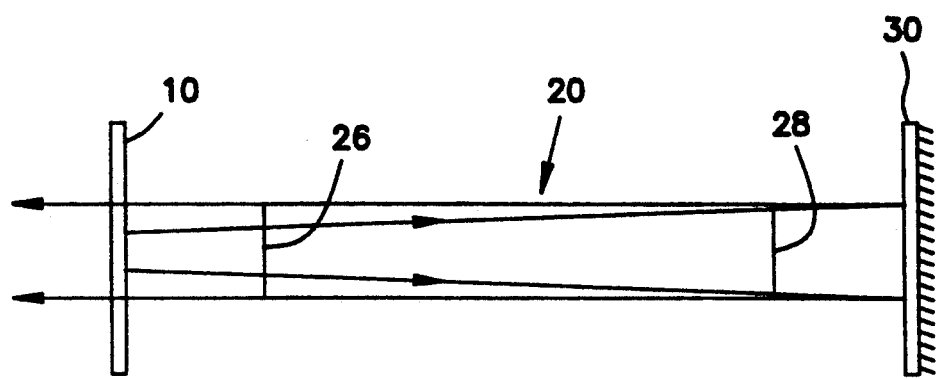
FIG. 15 is a schematic side view of a planar unstable resonator using a GRM as an output coupler.

One can also use a planar unstable resonator as shown in FIG. 15. This resonator has the advantage of using cylindrical mirrors.

Figure 16:
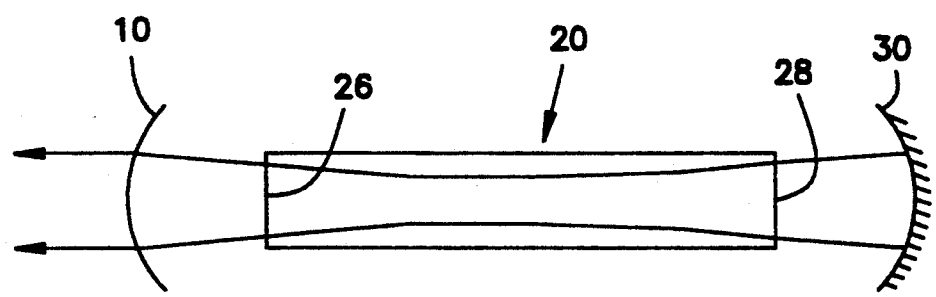
FIG. 16 is a schematic side view of a stable-unstable resonator using a GRM as an output coupler.
Figure 17:
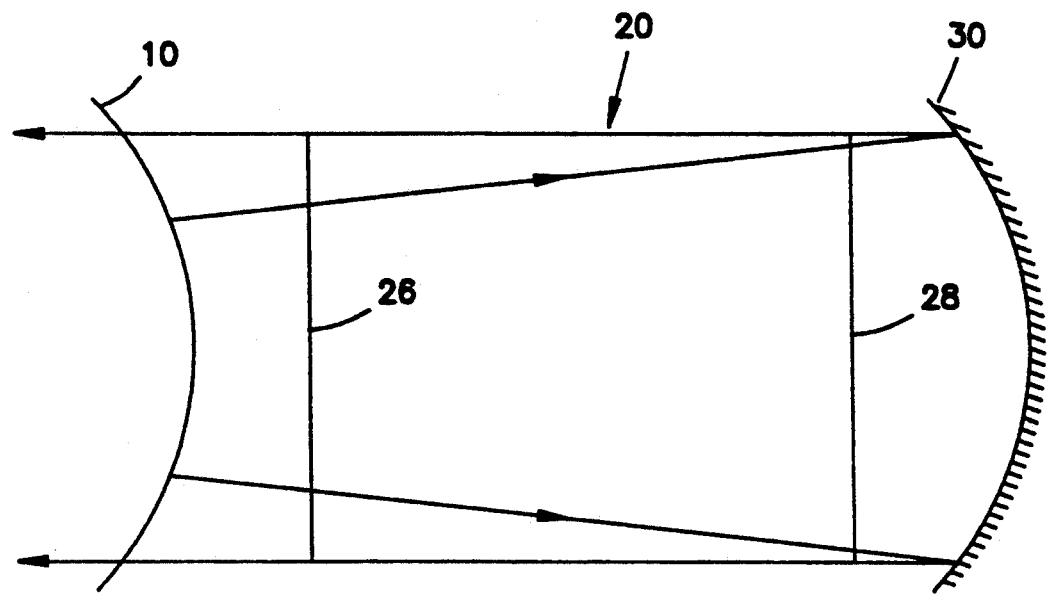
FIG. 17 is a schematic top view of the resonator of FIG. 16.

One can also use an astigmatic stable-unstable resonator, as shown in FIGS. 16 and 17, with a GRM having iso-reflectivity curves which are concentric circles or straight lines parallel to the height of the gain medium. Such a configuration will be preferable when the height of the gain medium is small enough to allow a good modal control with a resonator which is geometrically stable along this dimension. Such configurations will provide a higher feedback compared to the fully unstable ones. They will thus be preferable with lower gain lasers. The variation of the reflectivity along the height of the gain medium 20 of the GRM 10 with circular iso-reflectivity curves will reduce only slightly the feedback when the aspect ratio is large.

Figure 18:
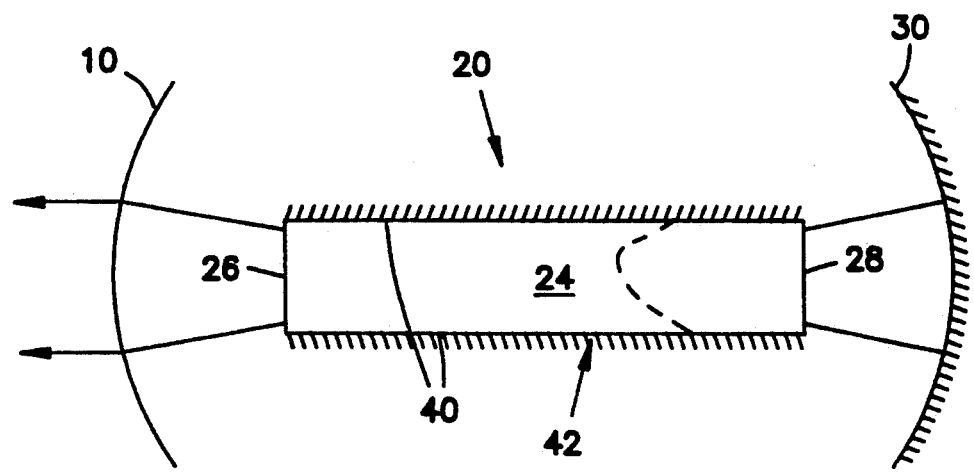
FIG. 18 is a schematic side view of a hybrid waveguide unstable resonator using a GRM as an output coupler.

The anisotropic GRM resonator can also be designed as a hybrid waveguide unstable resonator, as shown in FIG. 18. The resonator is then astigmatic. In one direction, it is designed to support a fundamental mode which matches that of a planar waveguide 42 having parallel plates 40 inserted in the resonator. Perpendicularly to this, the resonator is unstable as described earlier. The iso-reflectivity curves of the GRM should preferably be straight lines perpendicular to the plane of the waveguide.

The GRM anisotropic resonator allows the efficient extraction of energy and the production of a good optical quality output beam with lasers having a gain medium with a large aspect ratio, as long as the gain of the laser is sufficient to allow the use of a practical magnification along the width of the gain medium. Good candidates for this type of resonator are the solid-state slab lasers, with a straight-through or zig-zag path down the gain medium, and the gas slab laser, with the gain medium contained by a planar waveguide. This resonator is not suitable however for very low gain lasers.

What is claimed is:

1. A resonator for a laser with a gain medium having a non-circular cross-section, said resonator comprising:
    a first mirror having a center of curvature and a uniform reflectivity; and
    a graded reflectivity mirror facing said first mirror, said graded reflectivity mirror also having a center of curvature,
    said centers of curvature of said first mirror and said graded reflectivity mirror being situated on a same optical axis, wherein said graded reflectivity mirror has non-circular iso-reflectivity curves.

2. A resonator for a laser with a gain medium having a non-circular cross-section, said resonator comprising:
    a first mirror having a center of curvature and a uniform reflectivity; and
    a graded reflectivity mirror facing said first mirror, said graded reflectivity mirror also having a center of curvature,
    said centers of curvature of said first mirror and said graded reflectivity mirror being situated on a same optical axis perpendicular to an x and a y axis that are also perpendicular to one another, wherein said resonator is astigmatic with principal axes parallel to the said x and y axes.

3. The resonator of claim 2, wherein said resonator is unstable along said x axis.

4. The resonator of claim 3, wherein said resonator is unstable along said y axis.

5. The resonator of claim 4, wherein the said GRM has non-circular iso-reflectivity curves.

6. The resonator of claim 3, wherein said first mirror and said GRM are cylindrical and flat along said y axis.

7. The resonator of claim 6, wherein the said GRM has non-circular iso-reflectivity curves.

8. The resonator of claim 3, wherein the said resonator is stable along said y axis and the iso-reflectivity curves of said GRM are straight lines along said y axis.

9. The resonator of claim 3, wherein the said resonator is stable along said y axis and the iso-reflectivity curves of said GRM are concentric circles.

10. The resonator of claim 3, wherein the said resonator supports a mode which matches that of a planar waveguide along said y axis.

* * * * *